L. ALARD.
APPARATUS FOR MODIFYING THE TRAJECTORY OF A PROJECTILE.
APPLICATION FILED JAN. 27, 1914.

1,166,879.

Patented Jan. 4, 1916.
10 SHEETS—SHEET 1.

L. ALARD.
APPARATUS FOR MODIFYING THE TRAJECTORY OF A PROJECTILE.
APPLICATION FILED JAN. 27, 1914.

1,166,879. Patented Jan. 4, 1916.
10 SHEETS—SHEET 2.

L. ALARD.
APPARATUS FOR MODIFYING THE TRAJECTORY OF A PROJECTILE.
APPLICATION FILED JAN. 27, 1914.

1,166,879.

Patented Jan. 4, 1916.
10 SHEETS—SHEET 3.

L. ALARD.
APPARATUS FOR MODIFYING THE TRAJECTORY OF A PROJECTILE.
APPLICATION FILED JAN. 27, 1914.

1,166,879.

Patented Jan. 4, 1916.
10 SHEETS—SHEET 4.

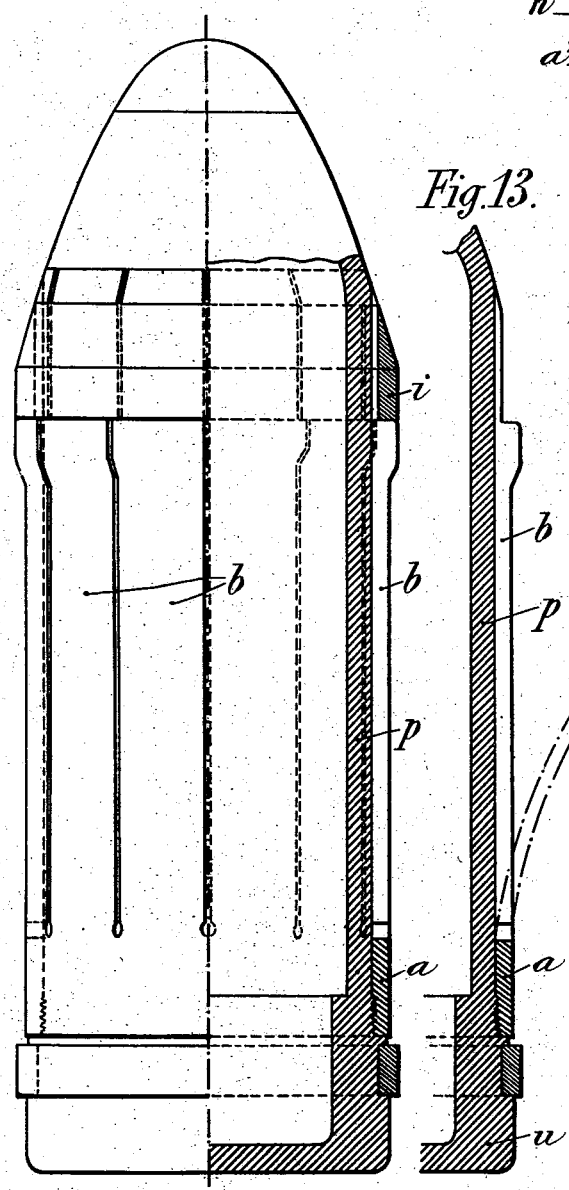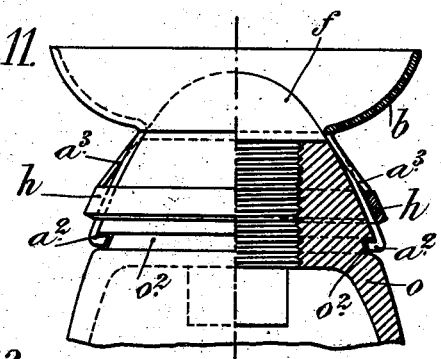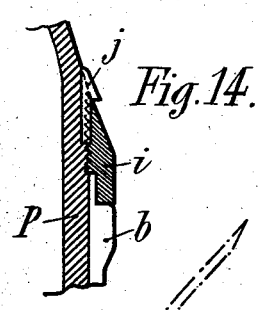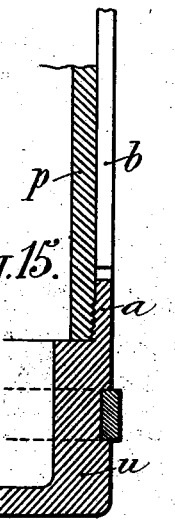

L. ALARD.
APPARATUS FOR MODIFYING THE TRAJECTORY OF A PROJECTILE.
APPLICATION FILED JAN. 27, 1914.

1,166,879.

Patented Jan. 4, 1916.
10 SHEETS—SHEET 6.

L. ALARD.
APPARATUS FOR MODIFYING THE TRAJECTORY OF A PROJECTILE.
APPLICATION FILED JAN. 27, 1914.
1,166,879.
Patented Jan. 4, 1916.
10 SHEETS—SHEET 7.
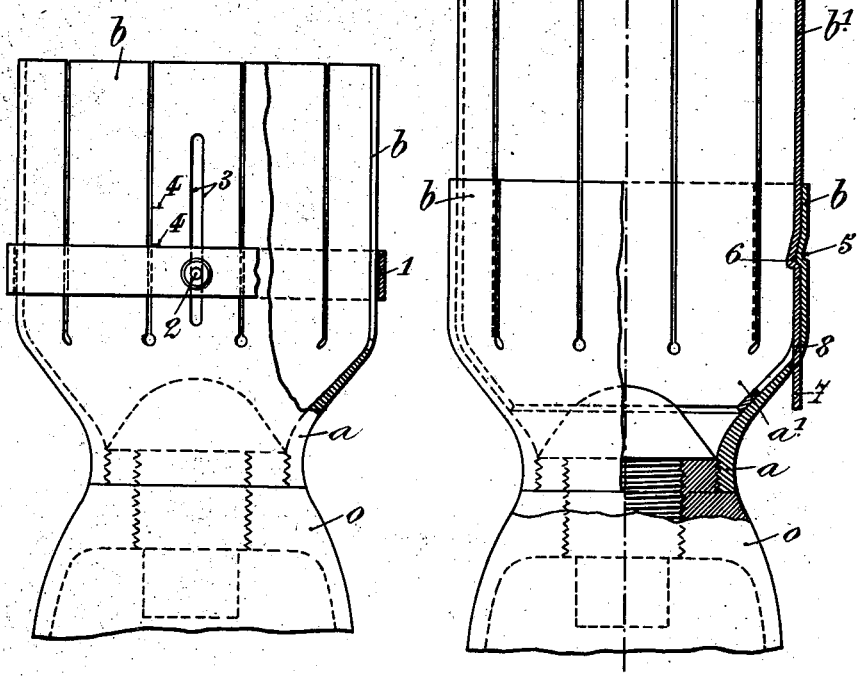
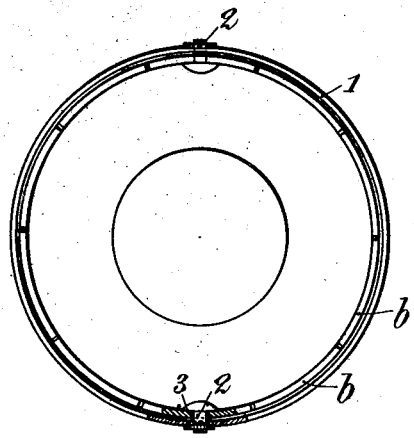

L. ALARD.
APPARATUS FOR MODIFYING THE TRAJECTORY OF A PROJECTILE.
APPLICATION FILED JAN. 27, 1914.
1,166,879.
Patented Jan. 4, 1916.
10 SHEETS—SHEET 8.
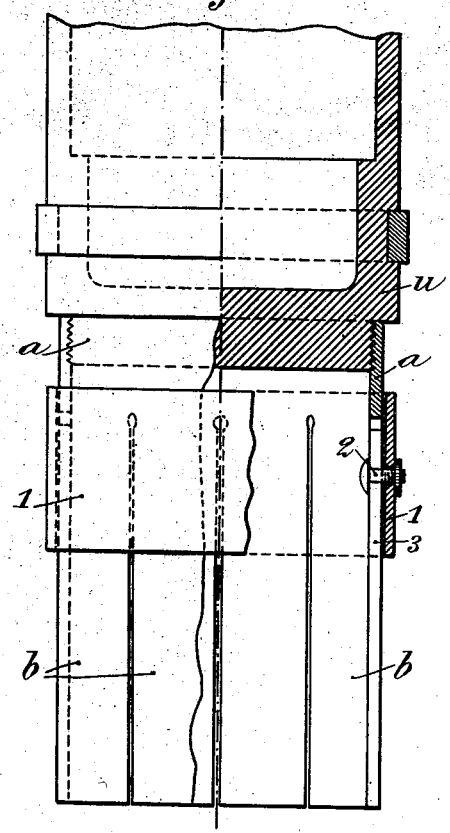
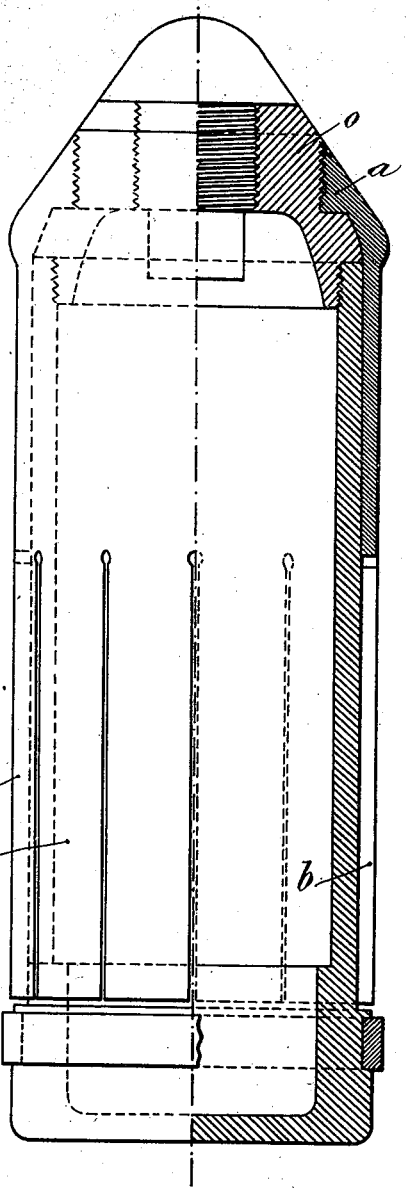
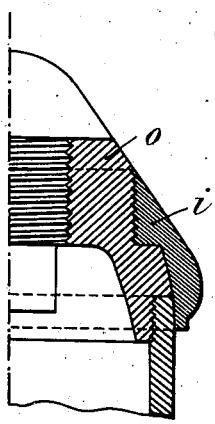
Inventor:
Louis Alard

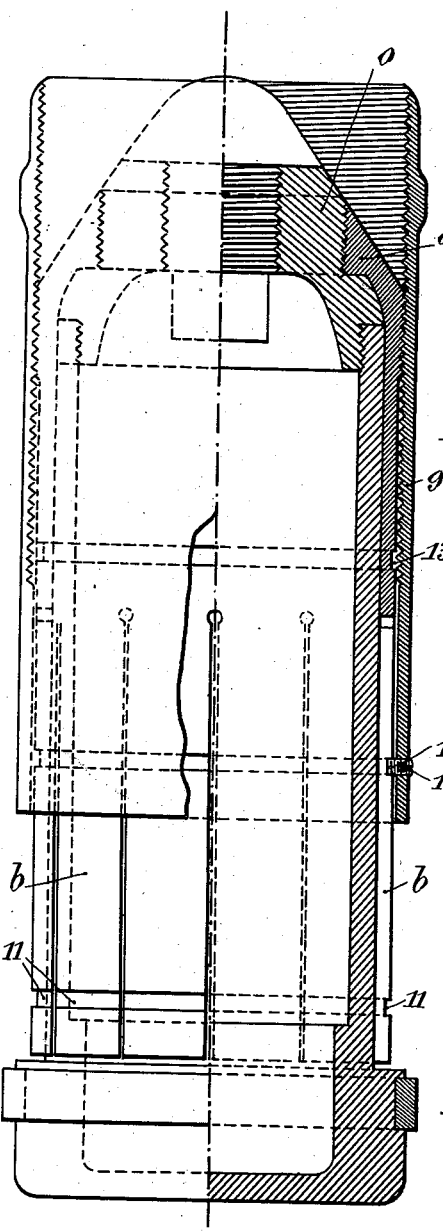
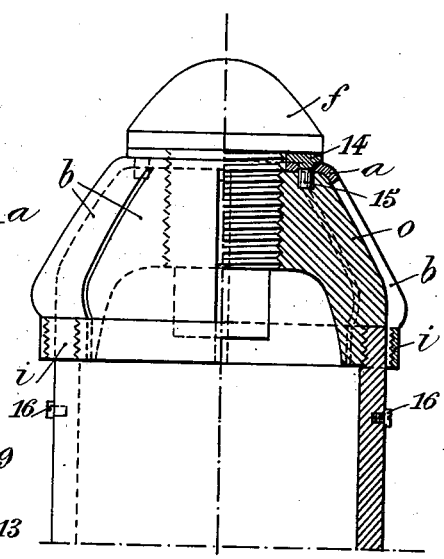
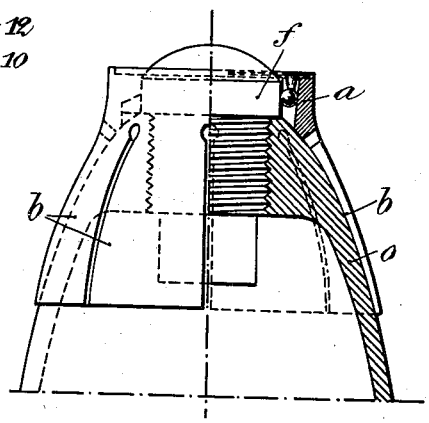

UNITED STATES PATENT OFFICE.

LOUIS ALARD, OF PARIS, FRANCE.

APPARATUS FOR MODIFYING THE TRAJECTORY OF A PROJECTILE.

1,166,879.  Specification of Letters Patent.  Patented Jan. 4, 1916.

Application filed January 27, 1914. Serial No. 814,639.

*To all whom it may concern:*

Be it known that I, LOUIS ALARD, citizen of the Republic of France, residing at No. 38 Avenue de Wagram, Paris, France, have invented certain new and useful Improvements in Apparatus for Modifying the Trajectory of a Projectile, of which the following is a specification.

My invention has for its object to provide apparatus whereby without the charge of the gun being changed, a projectile can be adapted in such a manner that it will follow a flattened or a curved trajectory as desired.

My improved apparatus consists substantially of a screen-like element or braking device, preferably removable and adapted to be quickly fixed in place by means of bolts, catches or other devices, on the ogival portion or on the fuse head of the projectile, or between these two parts, or on the body proper of the projectile. The said device when in operative position will obviously have a braking action tending to incline the trajectory *i. e.* curve its trajectory.

The braking device instead of being rigid, may be so constructed as to be capable of opening out or unfolding under the action of air pressure and centrifugal force, while owing to its construction, or by means of suitable temporary confining means the braking device during the charging of the gun and during the travel of the projectile in the barrel of the gun, will be kept folded, collapsed or flat against the surface of the projectile.

Several embodiments of my invention are illustrated by way of example in the accompanying drawings in which:—

Figure 1:
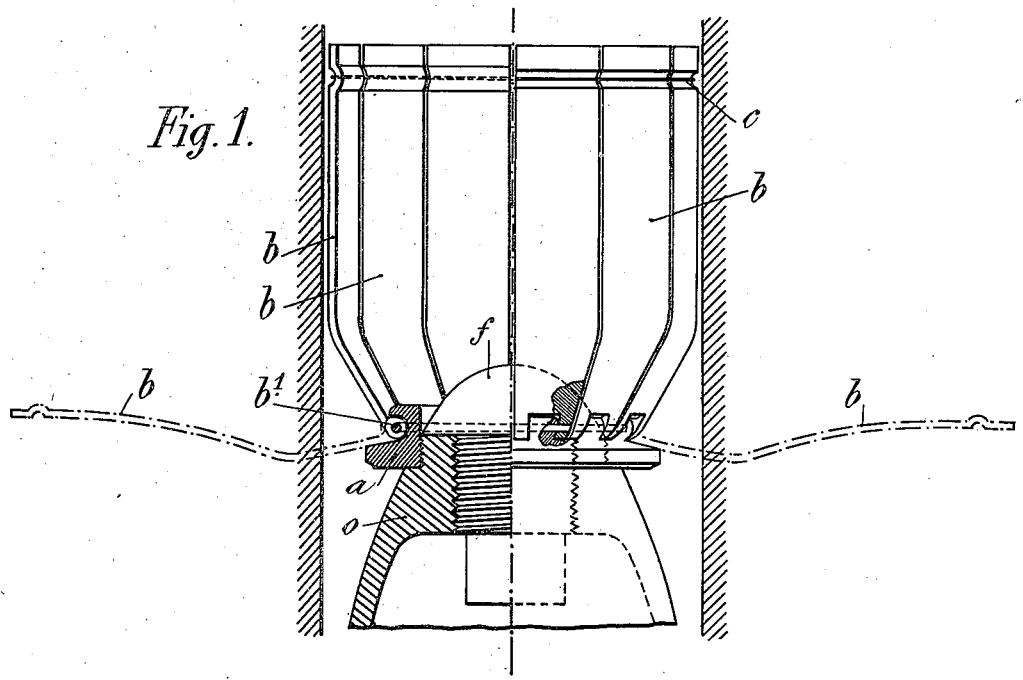
Figure 2:
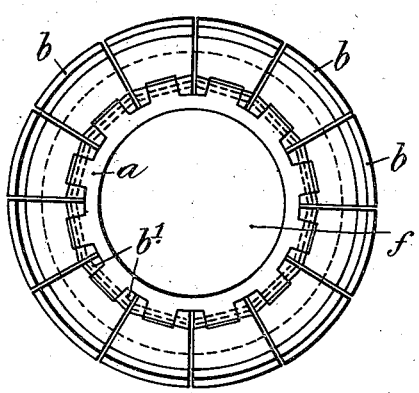
Figure 7:
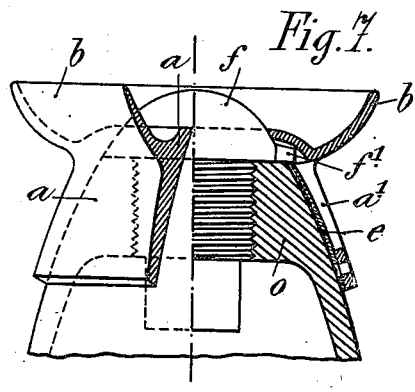
Figure 6:
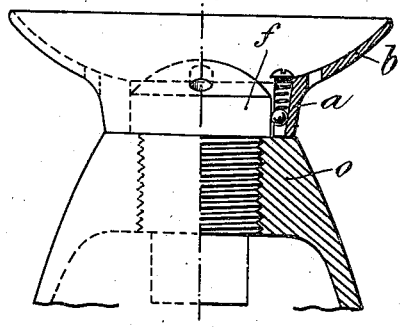
Figure 8:
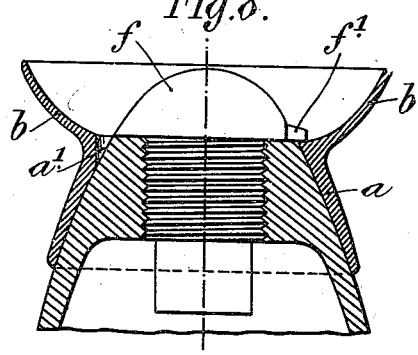
Figure 3:
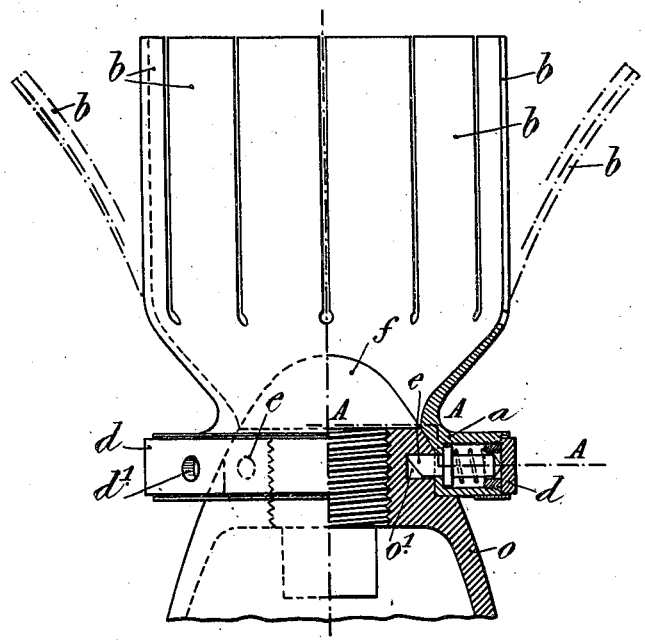
Figure 4:
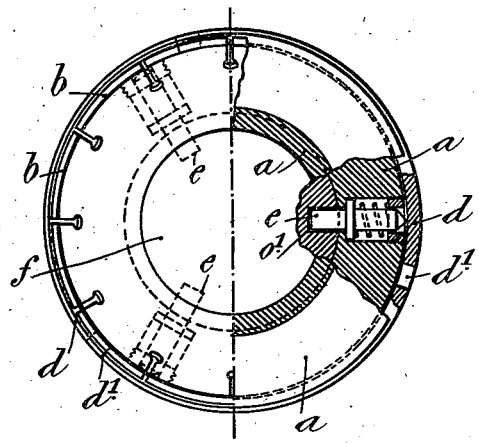
Figure 5:
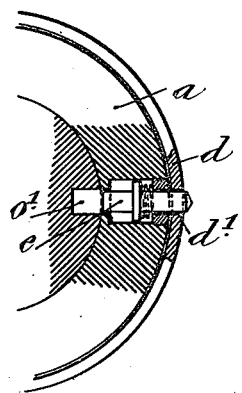
Figure 9:
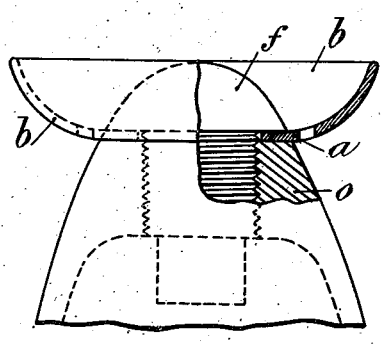
Figure 10:
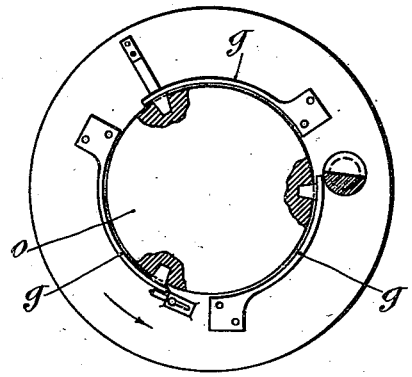
Figure 16:
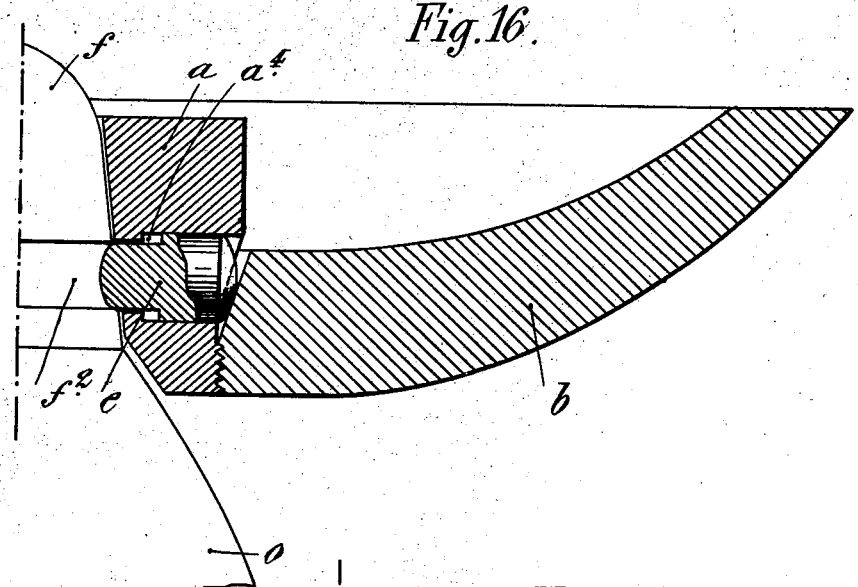
Figure 30:
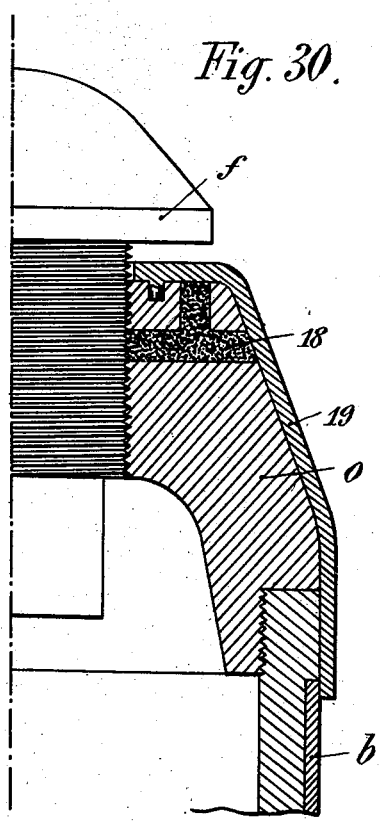
Figure 26:
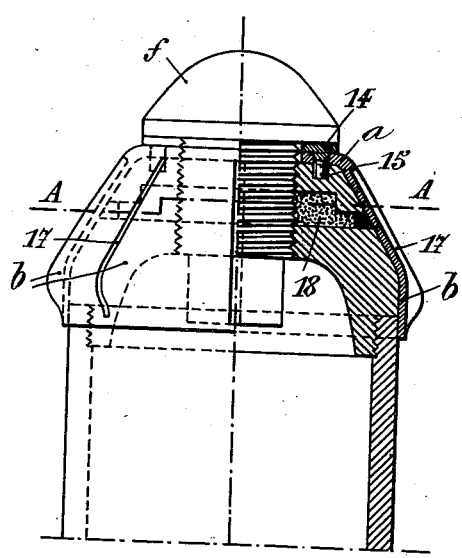
Figure 28:
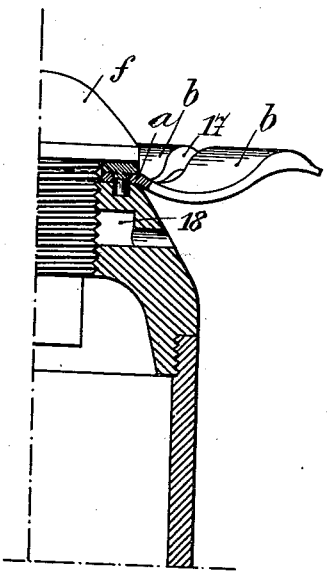
Figure 27:
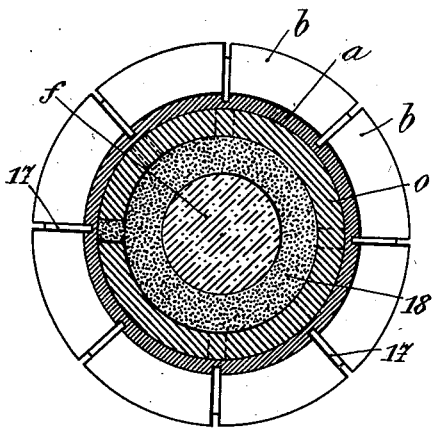
Figure 29:
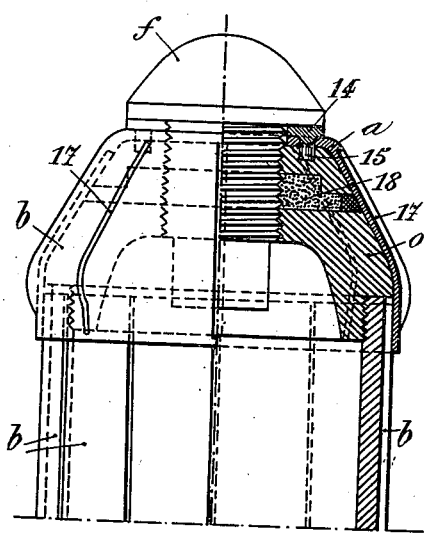

Figure 1 illustrates half in elevation and half in longitudinal section, one modification of the improved apparatus. Fig. 2 is a plan thereto. Figs. 3 and 4 are similar views of another modification. Fig. 5 shows a detail thereof. Fig. 6 illustrates half in elevation and half in longitudinal section, a modification in which the device for breaking the projectile is rigid. Fig. 7 illustrates a modification of a removable rigid braking device. Fig. 8 illustrates a modification of Fig. 7. Fig. 9 illustrates a modification analogous to those shown in Figs. 6, 7 and 8. Fig. 10 is a plan of a further modification of a braking device. Fig. 11 illustrates a modification analogous to that shown in Fig. 8. Fig. 12 is a side elevation partly in longitudinal section, and Fig. 13 is a part longitudinal section of a modification. Figs. 14, 15 and 16 are part longitudinal sections illustrating corresponding modifications. Fig. 17 is a side elevation, partly in section, and Fig. 18 is a plan also partly in section, of a modified braking device. Fig. 19 is a side elevation, partly in section of a further modification. Fig. 20 is a side elevation partly in section of a modified braking device. Fig. 21 is a side elevation partly in longitudinal section of a modified form of the improved apparatus. Fig. 22 is a part longitudinal section showing a modification. Fig. 23 illustrates half in side elevation and half in longitudinal section a projectile provided with a modification of the improved apparatus. Figs. 24, 25 and 26 are similar views of part of a projectile provided with different modifications of the improved apparatus. Fig. 27 is a cross section on the line A—A of Fig. 26. Fig. 28 is a partial half longitudinal section of the projectile shown in Fig. 26, showing the apparatus in a different position. Fig. 29 illustrates half in side elevation and half in longitudinal section a modification, and Fig. 30 illustrates in half longitudinal section a portion of a projectile fitted with a further modification.

As shown in Figs. 1 and 2, the braking device consists of a kind of sleeve formed of a base piece *a* adapted to be screwed, for instance, on the ogival portion *o* which is provided for this purpose with a suitable screw-thread below the supporting shoulder of the fuse head. To this base piece are pivoted a number of strips or vanes *b* each formed near its free end with a groove for the reception of a temporary tie *c*. This tie is made so weak that immediately the projectile shall have issued from the barrel of the gun, the said tie will be broken by the action of the centrifugal force which tends to cause the vanes *b* to fly outward. As soon as the said tie is broken, the vanes will turn on their pivots *b'*, and will take up a position approximately at right angles to the axis of the projectile either owing to the centrifugal action, or by bearing upon the base piece *a*, as indicated in dot-and-dash lines in Fig. 1.

In the modification shown in Figs. 3 and 4, the vanes *b* of the removable sleeve form part of the base piece *a*. The sleeve in opening under centrifugal force assumes a tulip-shape by reason of the flexibility of the metal and the small width of the base of each vane. The manner of fixing the base piece $a$ is different from that shown in the preceding example, and consists of a number of bolts $e$ which are adapted to engage in sockets $o'$ provided in the ogival part $o$, and which may be kept in engagement for instance by means of a retaining ring $d$ turnable in a groove in the base piece. In fitting the apparatus on to the projectile, the noses of the bolts $e$ in sliding over the ogival part are automatically pushed back and the tails of the bolts move back into corresponding holes $d'$ of the ring $d$. As soon as the said noses are brought opposite the sockets $o'$ they will enter the latter. Then by turning the ring $d$ to a slight extent, it may be moved from the position shown in Fig. 5 into that shown in Fig. 4, thereby locking the engagement between the base piece $a$ and the ogival part of the projectile.

In the modification shown in Fig. 6, the device for braking the projectile is rigid and consists of a saucer-shaped member $b$ having a maximum diameter equal to the diameter of the bore of the gun. The saucer $b$ extends outward from a base piece $a$ which fits on the outside of the head $f$. The base piece may be fastened on the fuse head or on the projectile by any suitable means. In the example, a fastening similar to an "autolock" is employed.

In Fig. 7 a modified removable rigid braking device is employed, consisting of a saucer-like member $b$ extending outward from a base piece $a$ which has an inner surface fitting the fuse head and the ogival part of the projectile, and which may be fixed in place by the means indicated on the right hand half of the figure, in the case of a fuse head provided with a tenon. A spring bolt $e$ fitted to the base piece and slidable in an aperture $a'$ in the latter, is adapted to engage by means of its free end underneath the tenon $f'$ of the fuse head.

In the modification shown in Fig. 8, the base piece $a$ has simply a notch $a'$ cut in it to allow the tenon $f'$ to pass through when mounting the apparatus $a\ b$ on to the projectile; the said apparatus being subsequently turned on its axis so as to bring the tenon $f'$ over a solid portion of the base piece.

In the modification shown in Fig. 9, the braking device consists of a saucer-like member $b$ similar to that shown in Figs. 6, 7 and 8, and the base piece $a$ is constituted by a portion of the saucer which is pierced with a central hole having a smaller diameter than the fuse head, so that the whole $a\ b$ can be held clamped between the fuse head and the ogival portion $o$.

Fig. 10 illustrates a braking device composed of a simple disk which is held on the ogival portion $o$ or on the fuse head $f$ by means of engagement such as spring catches $g$ having noses which engage in corresponding recesses in the projectile.

In the modification shown in Fig. 11, claws $a^2$ cut from the metal of the base piece $a$ engage by means of bent noses in a groove $o^2$ formed in the ogival $o$. Lugs $a^3$ likewise cut from the metal of the base piece serve to retain a ring $h$ which is adapted to be slidden under their free ends after the braking device has been mounted on the projectile. This ring $h$ thus serves to tighten the claws $a^2$, and it is itself prevented from slipping off toward the saucer $b$, by the tongues $a^3$ which have been suitably raised.

Figs. 12 and 13 illustrate a construction in which the braking device is mounted on the body part of the projectile. The said device consists of a sleeve whose lower portion $a$ constitutes a base supporting a number of strips $b$ which are maintained normally close up and along the projectile near their upper or outer ends by means of a ring $i$. So long as this ring $i$ remains on the projectile, the latter can be projected along a full or flattened trajectory. If however the ring $i$ is removed before placing the projectile in the gun, the strips $b$ will be caused by the centrifugal force on discharge to assume a position indicated in dot-and-dash lines in Fig. 13.

In a modification shown in Fig. 14, the ring $i$, instead of being simply slipped over the strips $b$, is held in place by shoulders formed on the strips, and it is further provided with screw-thread to enable it to be screwed upon a corresponding screw-threaded portion of the body $p$ of the projectile. $j$ is a key for locking the ring in its place on the projectile.

In the modification shown in Fig. 15, the base-piece $a$ forms one piece with the base $u$ of the projectile, and the shell $p$ of the projectile screws inside the base-piece $a$.

Fig. 16 shows a modified apparatus designed particularly to be fixed upon a projectile whose fuse head presents no projecting part by means of which the base piece of the braking device or the saucer can be attached. In this modification the braking device comprises a base-piece $a$ which is simply slipped directly upon the fuse head $f$ and the ogival portion $o$ of the projectile. The extreme rear portion of this base-piece is screw-threaded to receive the braking saucer $b$. The fixing of the whole $a\ b$ is effected by means of a catch pin $e$ slidable in a corresponding recess $a^4$ in the base-piece $a$. The head of the inner end of the pin $e$ is designed to engage in a groove $f^2$ in the body part of the fuse. To lock the parts, it is merely necessary to place the whole $a\ b$ in position; the saucer $b$ not being screwed home upon the base piece $a$, so that the inner head of the pin $e$ is able to slide outward. When the whole $a\ b$ has been placed in position, the head of the pin is engaged in the groove $f^2$, while the saucer $b$ is screwed home upon the base-piece $a$. If desired, the groove $f^2$ may be formed in the head of the projectile.

Figs. 17 and 18 illustrate a modified braking device provided with a regulating means which will allow of the braking action being varied at will within certain limits. In this modification the braking device is constructed similarly to that shown in Figs. 1, 2 and 3, that is to say, it is constituted by a deflector comprising on a base-piece $a$ fixed on the ogival portion $o$, a number of strips $b$ adapted to be moved outward by centrifugal force. A ring 1 is slipped over the strips $b$ and is fixed at a variable distance from the free edges of the said strips, for instance, by means of set screws 2 whose shanks are slidable in corresponding slots 3 formed in one of the strips. Two such set screws 2, located diametrically opposite each other, will be sufficient to fix the ring 1. The strips in which the set screws 2 are guided may have register marks 4 to indicate determined positions of regulation. It is to be understood that by fixing the ring 1 at a point near the outer ends of the strips, the flexibility of the latter will be considerably diminished, with a corresponding diminution in the area of that portion of the strips which opens out and thus offers an additional resistance to the flight of the projectile.

Another modification for the purpose of varying the braking action is shown in Fig. 19, where the braking device consists as before of a base-piece $a$ branching out into a number of strips $b$ which are designed to open out under the action of centrifugal force. The regulating device in this case is constituted by a chalice-shaped member formed of a base-piece $a'$ with strips $b'$. The diameter of the base-piece $a'$ is such as to enable the latter to fit inside the base-piece $a$, so that the strips $b'$ bear at their lower ends against the lower surface of the strips $b$, while their upper ends project beyond the upper ends of the strips $b$. The additional braking device thus formed constitutes a kind of extension which is adapted to open out together with the main braking device $a$—$b$ fixed on the ogival portion, the fuse head or the body part of the projectile. The auxiliary braking device $a'$ $b'$ may be fixed in position by any suitable means.

The means employed in Fig. 19 consists for fixing or connecting the auxiliary braking device to the main braking device. As shown, one or more strips $b$ of the main braking device are formed with depressions 5 which form corresponding projections on their inner sides adapted to engage in corresponding depressions 6 in the strips $b'$ of the auxiliary braking device. A tongue 7 which may be cut from one of the strips $b'$ is engaged in a slot 8 in the corresponding strip $b$ or in the base-piece $a$. This connecting or locking means may be replaced by any other suitable means which will insure a sufficient degree of adhesion of the auxiliary braking device to the main braking device so as to prevent the auxiliary braking device being forced away from the main braking device by the force of the powder gases.

In the modified braking device illustrated in Fig. 20, the device, which is designed to open out under the action of centrifugal force, instead of being fixed on the ogival portion or on the body part of the projectile, is fixed on the base end of the projectile in a reversed position so that the braking device will open out toward the rear instead of toward the front.

The braking device may be constructed in any of the hereinbefore described ways. For instance it may be composed of a base-piece $a$ screwing upon the base $u$ of the projectile and having projecting from it toward the rear a number of strips $b$. The braking device thus constructed may be fitted as desired with one or other of the two regulating devices hereinbefore described, for instance a ring 1 adapted to be slipped over the strips of the braking device and be locked in different positions by means of locking bolts 2 working in slots 3 formed in two diametrically opposite strips.

Fig. 21 illustrates a braking device which is designed to open out toward the rear as in the preceding example, but which, instead of being fixed on the base of the projectile, is fixed by means of its base-piece $a$ on the ogival portion $o$. If it be desired to project the projectile with the ordinary full trajectory, the braking device $a$—$b$ must be replaced by a ring $i$ which will guide the projectile in the bore of the gun, as shown in Fig. 22.

Fig. 23 illustrates a braking device of the kind shown in Fig. 21 provided with a modified device for regulating the braking action, consisting of a sleeve 9 screwing upon the base-piece $a$ of the braking device and arranged to be locked at a variable distance from the free lower end of the strips $b$, for instance by means of a set screw 10 inserted through the sleeve in one of the peripheral grooves 11, 12 or 13 in the braking device.

Fig. 24 illustrates a braking device adapted to open out toward the rear and composed of a base-piece $a$ and a plurality of strips $b$. In this modification the base-piece $a$ is fixed between the ogival portion $o$ and the shouldered fuse head $f$ and will be rotated with the projectile by means of a washer 14 provided with a plurality of pins 15 extending through holes in the base-piece into corresponding recesses in the ogival portion. The braking device may be rendered inoperative by means of a ring $i$ arranged to be screwed over the screw-threaded ends of the strips $b$. When it is desired to render the deflector operative, the ring $i$ is unscrewed, and may be caught by stops 16 projecting from the body part of the projectile.

In the modified braking device illustrated in Fig. 25 which is adapted to open out toward the rear and is composed of a base piece $a$ and a plurality of strips $b$, the base-piece $a$ is adapted to be fixed at the moment of use upon the fuse head $f$ by means of an "autolock" device such as that shown in Fig. 6. The fuse head is provided with a pin engaging in a notch in the base-piece for insuring that the braking device shall be rotated with the projectile.

The modified braking device illustrated in Figs. 26, 27 and 28, which is arranged to open out toward the rear, and is fixed between the fuse head and the ogival portion, consists of a base-piece $a$ and a body part fitting the ogival surface of the projectile. This body part is adapted to open out owing to a plurality of grooves or scores 17 which reduce the thickness of the said body part at intervals along a plurality of lines of rupture. The rupture is produced by the action of the gases given off by a ring 18 of fuse composition which is provided in the ogival portion and which can be ignited after the lapse of a predetermined period of time through a passage connecting the said ring with a special fuse ring additional to the time fuse. It is to be understood that the device for igniting the ring 18 of fuse composition may be used with any known type of percussion fuse, or double or triple acting fuse as desired. Fig. 28 shows the saucer-shaped member after its deformation due to the combined action of the gases given off by the annular fuse 18 and centrifugal force.

In the modification illustrated in Fig. 29 the saucer which is opened out toward the rear by the combined action of the gases given off by an annular fuse 18 and centrifugal force, constitutes also a retaining device for the upper ends of a plurality of strips $b$ of a powerful brake of the type shown in Figs. 12 and 13.

In the modification illustrated in Fig. 30 wherein a continuous, that is to say, non-grooved saucer 19 constitutes a retaining device for the upper ends of a plurality of strips $b$ of a powerful brake of the type shown in Figs. 12 and 13, a ring 18 of fuse composition is provided and arranged in such a manner that the gases given off by it shall act upon the portion of the saucer which is engaged between the ogival portion $o$ and the fuse head $f$. In this modification the saucer 19 is designed solely to move away so as to free the strips $b$, this movement being rendered possible either by providing an amount of "play" between the saucer and the rear of the fuse head $f$, slightly greater than the overlap of the saucer on the strips, or by guiding the saucer 19 on the fuse head by means of notches in the fuse head $f$ engaging over corresponding projections on the base-piece of the saucer, or vice versa.

The modifications just described and illustrated in Figs. 26–30 are not claimed herein, the said modifications having been made the subject matter of a divisional application.

Having now described my invention what I claim as new and desire to secure by Letters Patent is:—

1. Apparatus for modifying the trajectory of a projectile, comprising a braking device adapted to be mounted concentrically and symmetrically on the projectile, with means for fixing it on the projectile in such a manner as to transform the trajectory of the latter making it equivalent to that secured heretofore with a field howitzer only.

2. Apparatus for modifying the trajectory of a projectile, comprising a braking device composed of a base-piece encircling the projectile and a plurality of strips connected to and extending annularly from said base-piece and normally, located close together longitudinally around the projectile, means for rigidly connecting said base-piece to the projectile and means for temporarily retaining said strips in their normal position, and adapted to be operated by centrifugal force to release said strips and allow them to open outward and thus exert a braking action upon the flight of the projectile.

3. Apparatus for modifying the trajectory of a projectile, comprising a braking device composed of a base-piece encircling the projectile and a plurality of strips connected to and extending annularly from said base-piece and normally, located close together longitudinally around the projectile, means for rigidly connecting said base-piece to the projectile, means for temporarily retaining said strips in their normal position, and adapted to be operated by centrifugal force to release said strips and allow them to open outward and thus exert a braking action upon the flight of the projectile and means carried by the projectile for regulating the braking action of the braking device.

4. Apparatus for modifying the trajectory of a projectile, comprising a braking device composed of a base-piece encircling the projectile and a plurality of strips extending annularly from said base-piece and normally, located close together longitudinally around the projectile, means for rigidly connecting said base-piece to the projectile, means for temporarily retaining said strips in their normal position, and adapted to be operated by centrifugal force to release said strips and allow them to open outward and thus exert a braking action upon the flight of the projectile and a movable ring surrounding the strips and adapted to be adjusted at a variable distance from the free ends of said strips, thereby regulating the braking action of the braking device.

5. Apparatus for modifying the trajectory of a projectile, comprising a braking device composed of a base-piece encircling the projectile and a plurality of strips connected to and extending annularly from said base-piece and normally, located close together longitudinally around the projectile, means for rigidly connecting said base-piece to the projectile, means for temporarily retaining said strips in their normal position and adapted to be operated by centrifugal force to release said strips and allow them to open outward and thus exert a braking action upon the flight of the projectile, and an auxiliary braking device mounted on the said braking device to increase the braking area of the latter.

6. Apparatus for modifying the trajectory of a projectile comprising a braking device mounted on the projectile and adapted to open outward toward the rear of the projectile, after the latter has issued from the gun so as to transform the trajectory of the projectile making it equivalent to that secured heretofore with a field howitzer only.

In testimony whereof, I have affixed my signature in presence of two witnesses.

LOUIS ALARD.

Witnesses:
 Louis Fautrat,
 Hanson C. Coxe.